US008223753B2

(12) United States Patent
Hu et al.

(10) Patent No.: US 8,223,753 B2
(45) Date of Patent: Jul. 17, 2012

(54) APPARATUS FOR A TERMINAL TO ACCESS AN IMS SYSTEM AND THE METHOD THEREOF

(75) Inventors: Xianli Hu, Shenzhen (CN); Gang Wang, Shenzhen (CN)

(73) Assignee: ZTE Corporation, Guangdong Province (CN)

( * ) Notice: Subject to any disclaimer, the term of this patent is extended or adjusted under 35 U.S.C. 154(b) by 1213 days.

(21) Appl. No.: 11/993,635

(22) PCT Filed: Jul. 22, 2005

(86) PCT No.: PCT/CN2005/001105
§ 371 (c)(1), (2), (4) Date: Dec. 21, 2007

(87) PCT Pub. No.: WO2007/009298
PCT Pub. Date: Jan. 25, 2007

(65) Prior Publication Data
US 2010/0046499 A1 Feb. 25, 2010

(51) Int. Cl.
*H04L 12/66* (2006.01)

(52) U.S. Cl. .......................... 370/353; 370/466; 370/467

(58) Field of Classification Search .................. 370/352, 370/401, 410, 466, 467
See application file for complete search history.

(56) References Cited

U.S. PATENT DOCUMENTS

2003/0026245 A1* 2/2003 Ejzak ............................ 370/352
2003/0222819 A1* 12/2003 Karr et al. ...................... 342/457
2004/0122934 A1* 6/2004 Westman et al. ............. 709/223
2004/0146040 A1 7/2004 Phan-Anh et al.
2004/0151205 A1* 8/2004 Kang ............................ 370/466
2006/0149811 A1* 7/2006 Bennett et al. ................ 709/203
2006/0154665 A1* 7/2006 Svensson et al. ............. 455/436
2006/0206504 A1* 9/2006 Cai et al. ........................ 707/100
2007/0070962 A1* 3/2007 Kilburn et al. ................ 370/338
2007/0100981 A1* 5/2007 Adamczyk et al. ........... 709/223

FOREIGN PATENT DOCUMENTS

CN 1610330 4/2005
WO WO 99/17512 4/1999

OTHER PUBLICATIONS

Maher Hamdi et al., Voice Service Interworking for PSTN and IP Networks, IEEE Communications Magazine, May 1999, XP-000830888, pp. 104-111.
Tispan NGN Functional Architecture PSTN/ISDN Emulation Subsystem; IMS-based functional architecture. Draft ETSI TS 1XX XXX v<1.1.5> (Jun. 2005), pp. 1-24.

* cited by examiner

*Primary Examiner* — Pao Sinkantarakorn
*Assistant Examiner* — Ajay Cattungal
(74) *Attorney, Agent, or Firm* — Frommer Lawrence & Haug LLP; Thomas F. Presson

(57) ABSTRACT

An apparatus and method for realizing the access of a legacy terminal to an IMS system. The apparatus includes a session control module, a downlink signaling interface function module, a downlink bearer interface function module, an uplink signaling interface function module, an uplink bearer interface function module and a media interworking module. The session control module registers the terminal that has entered service status to the I-CSCF on IMS side. During the session, the uplink signaling interface function module provides SIP signaling interaction with the CSCF function entity of IMS core network; the downlink signaling interface function module provides signaling interaction with the legacy terminal; the media interworking module provides the connection and media adaptation between the uplink bearer interface function module and the downlink bearer interface function module. The invention enables the services of the legacy networks such as PSTN/ISDN and the like to be integrated with those of IMS networks, thus reducing the cost of network construction and operation.

11 Claims, 6 Drawing Sheets

100 terminal side
IMS core network side
11
12
13
downlink SIF module
session control module
uplink SIF module
downlink BIF module
media communication module
uplink BIF module
6
8
14
15
16

APPARATUS FOR A TERMINAL TO ACCESS AN IMS SYSTEM AND THE METHOD THEREOF

CROSS REFERENCE TO RELATED APPLICATIONS

This application claims a priority benefit, as a national stage U.S. application, to prior filed PCT Application PCT/CN2005/001105, filed on Jul. 22, 2005 and entitled, "An Apparatus for a Traditional Terminal to Access an IMS System and the Method Thereof" the entirety of which is hereby incorporated by reference herein.

BACKGROUND

1. Technical Field

The present invention refers generally to an access apparatus and the method thereof. More specifically, the present invention relates to a gateway proxy apparatus and method for connecting legacy Public Switch Telephone Network (PSTN) and Integrated Services Digital Network (ISDN) terminal users to a IP Multimedia Subsystem (IMS) system in the telecommunication area.

2. Background Discussion

IMS (IP Multimedia Subsystem) system architecture is proposed by 3GPP (the $3^{rd}$ Generation Partnership Project) organization. It is based on soft switching technology and is a subsystem that is super positioned on GPRS (General Packer Radio Service) network for supporting IP multimedia service. The main feature of IMS is that it employs SIP protocol (Session Initiation Protocol) as call control protocol and based on this, it realizes the irrelativeness between the service and the access network.

However, although IMS can realize the irrelativeness between the service and the access network, the access of legacy PSTN/ISDN terminal is not supported in conventional architecture.

Typically, integrating legacy fixed terminal service, a PSTN/ISDN emulation subsystem is usually super positioned on the basis of current IMS subsystem architecture, two methods are usually employed: one is that the legacy terminal connects to the gateway, and visits I/S-CSCF (Interrogating/Servicing CSCF) through P-CSCF using the gateway, and then the application layer provides PSTN/ISDN emulation service control; the other method is that AGCF (Access Gateway Control Function) is employed, wherein the legacy terminal connects to the gateway, controlled by AGCF, and visits I/S-CSCF through AGCF by gateway and then the application layer provides PSTN/ISDN emulation service control. Both the access methods need PSTN/ISDN emulation service equipment to provide PSTN/ISDN service for legacy terminals.

SUMMARY OF THE INVENTION

Typically, full-service operators and numerous legacy switching machines and terminals of PSTN/ISDN, are used to operate both mobile and fixed services, therefore, a core network system that supports both fixed access and mobile access will reduce not only the investment and construction costs for the full-service operators but also other operation costs as well, and furthermore, it will provide more competitive services on the basis of integrated service network.

Embodiments of the present invention provide an advancement in the state of the art by providing, for example, an apparatus for realizing the access of a legacy terminal to an IMS system and the method thereof. In the IMS system architecture, based on providing service functions such as PSTN/ISDN simulation for NGN terminals by IMS system, the integration of fixed and mobile networks within the core network may be realized.

Accordingly, one embodiment of the present invention is directed to an apparatus for realizing the access of a legacy terminal to an IMS system. The IMS system has CSCF function entity and obtains terminal user information from HSS. This includes a session control module, which is used to provide signaling interworking between signaling from terminal and SIP signaling, as well as the control of terminal registration and session. A downlink signaling interface function module is used to provide signaling interaction with legacy terminals. As controlled by the session control module, the downlink signaling interface function module provides legacy switch function for legacy terminals. A downlink bearer interface function module is used to provide media channel to legacy terminals and an uplink signaling interface function module is used to provide SIP signaling interaction with CSCF function entity of IMS core network. As controlled by the session control module, the uplink signaling interface function module provides SIP UA function for legacy terminals, and an uplink bearer interface function module provides media channel to IMS bearer network. A media interworking module provides a connection and media adaptation between the uplink bearer interface function module and the downlink bearer interface function module under the control of said session control module.

Another embodiment of the present invention is directed to a method for realizing the access of a legacy terminal to an IMS system, wherein the IMS system has CSCF function entity and can obtain terminal user service profile from HSS. The method includes, for example, detection, by a session control module, of whether the legacy terminal has entered service status through a downlink signaling interface function module, and registers the terminals that have entered service status to the I-CSCF on IMS side through said uplink signaling interface function module.

During the session, the S-CSCF on IMS side obtains the service profile of legacy terminal users based on the interaction with the HSS. Under the control of the session control module, the uplink signaling interface function module provides SIP signaling interaction with the CSCF function entity of IMS core network, and the downlink signaling interface function module provides the signaling interaction with the legacy terminals. As controlled by the session control module, the media interworking module provides the connection and media adaptation between the uplink bearer interface function module and the downlink bearer interface function module, controls the uplink bearer interface function module to provide the media channel to IMS bearer network and controls the downlink bearer interface function module to provide the media channel to the legacy terminals.

Yet another embodiment of the present invention provides PSTN/ISDN simulation service capability for Next Generation Networking (NGN) terminals by way of IMS system. By using an accessing apparatus, the legacy terminals of PSTN and ISDN and other suitable networks access IMS network, thus the services of legacy networks such as PSTN/ISDN and the IMS network can integrate, reducing the cost of network construction and operation.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
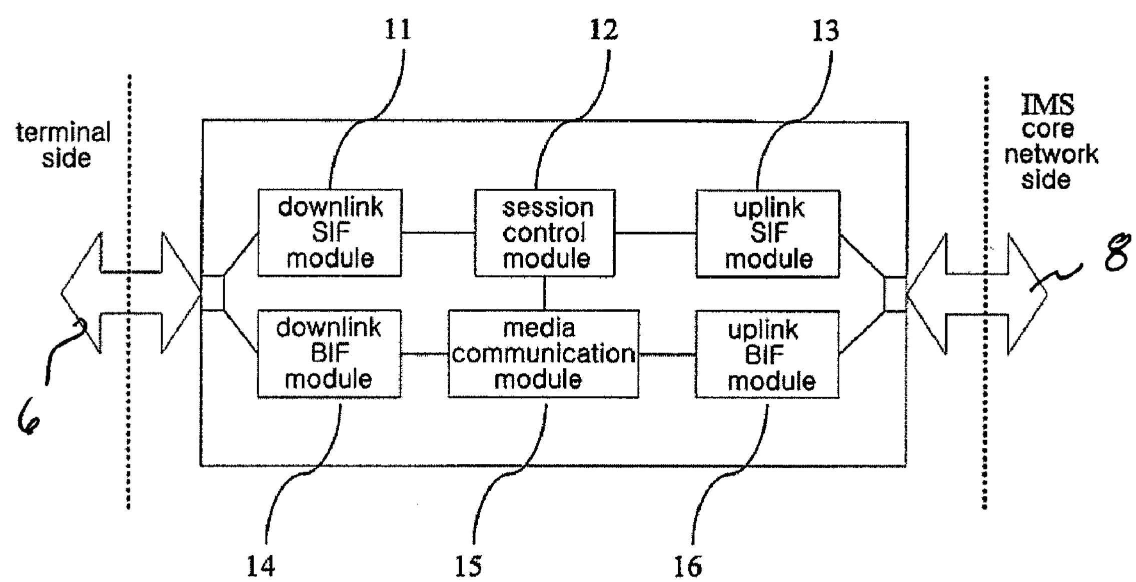
FIG. 1 is a structural schematic diagram of an example of an apparatus for realizing the access of a legacy terminal to an IMS system according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Embodiments of the present invention 1) utilize an IMS system to provide PSTN/ISDN simulation service function for NGN terminals, 2) offer the function entity and method for a legacy terminal accessing an IMS, and 3) realize the service integration of fixed network and mobile network in a core network and reduce the cost of network construction and operation.

One function entity in IMS is CSCF (call session control function) that is responsible for processing user multimedia session. The functions include, for example, multimedia session control, address translation and the service transformation for business negotiation. Based on IMS individual functions, the functions can be divided into the following three categories:

1. P-CSCF (Proxy-CSFS), which is the first touching point for the user terminals in IP multimedia subsystem;
2. S-CSCF (Servicing-CSCF), which is used for practically processing network session status; and
3. I-CSCF (Interrogating-CSCF), which refers to all the signed users that are connected to a network operator, or to the touching points in operators' network of roaming users that are currently located in the service area of the network operator.

Among those, P-CSCF forwards the SIP registration request sent by UE (user equipment) to I-CSCF. The I-CSCF is determined by the domain name provided by UE and forwards the SIP message sent by UE to S-CSCF. The S-CSCF is obtained by P-CSCF when UE launches the registration process.

I-CSCF designates an S-CSCF to execute SIP registration for the user. The I-CSCF obtains S-CSCF address from HSS (Home Subscriber Server), forwards SIP request and routes the SIP request that is transmitted from other networks to S-CSCF.

As a registration machine, after receiving the registration request, S-CSCF makes the registration request effective through HSS and performs session control for the registered session terminal. After S-CSCF receives the request, S-CSCF performs internal processing and forwarding, interrupting or launching SIP services, as well as interacting with service platform and providing multimedia service.

FIG. 1 shows an example of a structural schematic representation of the apparatus 100 for realizing the access of a legacy terminal to an IMS system according to an embodiment of the present invention. Apparatus 100 operates as a function entity LTAF (Legacy Terminals Agent Function), which comprises: a downlink SIF (Signaling Interface Function) module 11, a session control module 12, an uplink SIF module 13, a downlink BIF (Bearer Interface Function) module 14, a media interworking module 15 and an uplink BIF module 16. FIG. 1 also shows terminal side 6 and IMS core network side 8.

Among these, the session control module 12 is used to interwork between terminal signaling and SIP signaling and to control the terminal registration and session. The downlink SIF module 11 is used to provide signaling interaction with legacy terminal under the control of the session control module 12 to provide legacy switch function for legacy terminals. The downlink BIF module 14 is used to provide media channel with legacy terminals; the uplink SIF module 13 is used to provide SIP signaling interaction with CSCF function entity of IMS core network 8, and under the control of said session control module 12, to provide SIP UA function for legacy terminals. The uplink BIF module 16 is used to provide media channel with IMS bearer network; the media interworking module 15 is used to provide the media channel and media adaptation (e.g. the voice encode/decode conversion) between uplink bearer interface function module and downlink bearer interface function module under the control of said session control module.

The function entity LTAF provides the legacy terminals access IMS core network, and with the aid of PSTN/ISDN simulation service function for NGN terminal provided by IMS system, thereby PSTN/ISDN service is provided for legacy terminals. From the perspective of I/S-CSCF function entity, the LTAF apparatus 100 is a multi-user intelligent terminal apparatus with SIP UA (User Agent) function; from the perspective of the terminal (terminal side 6), the LTAF apparatus 100 is a legacy switch that can obtain the status of legacy terminals and complete signaling interaction function with legacy terminals.

According to embodiments of the present invention, LTAF apparatus 100 also comprises the signaling communication interface with the terminals, the media interface with the terminals, the SIP signaling interface with I/S-CSCF function entity of IMS network and the media interface with the bearer network of IMS. The LTAF apparatus 100 also provides SIP UA agent function for legacy terminals as well as the interworking function and session control function between legacy user protocols and SIP protocols.

Among these, SIP UA agent function provides that LTAF for a legacy terminal works as an UA described in IETF RFC3261. The interworking function between legacy user protocols and SIP protocols means that after LTAF apparatus 100 receives legacy signaling from the terminal side 6, the LTAF apparatus 100 converts the legacy signaling into corresponding SIP signaling and sends it to CSCF function entity, while at the same time, the LTAF apparatus 100 converts the SIP signaling received from I/S-CSCF function entity into the corresponding legacy user signaling and sends it to the terminals. The session control function means that LTAF apparatus 100 controls the session of legacy terminal based on the legacy signaling that is received from the terminal side 6 and the SIP signaling that is received from CSCF function entity, and completes the connection control and QoS control on session media.

For each legacy terminal, there is at least one corresponding terminal user in a LTAF apparatus 100.

The LTAF apparatus 100 supports Dual Tone Multi-Frequency (DTMF) capability and also performs QoS (Quality of service) control for session, for instance, LTAF apparatus 100 completes the QoS control function of the session by interacting with RACS subsystem of NGN system in European Telecommunications Standards Institute (ETSI) Telecommunications and Internet converged Services and Protocol for Advanced Networking (TISPAN).

The signaling link between said LTAF apparatus 100 and the terminals can employ Z interface, therefore it can provide the function of accessing IMS core network 8 for PSTN terminals. The signaling link can also employ Integrated Services Digital Network (ISDN) user interface, thus providing the function of accessing IMS core network 8 for ISDN terminals. Furthermore, the signaling link can employ, for example a V5 interface and provide the function of accessing IMS core network 8 for access network. The media interface between LTAF apparatus 100 and the bearer network of IMS core network 8 can employ a TDM interface as well as an IP interface.

The LTAF apparatus 100 can be provided with the authentication information of accessing IMS core network 8 for each terminal user. The LTAF apparatus 100 can also be provided with the authentication information of accessing IMS core network 8.

The LTAF apparatus 100 owns public identification information for each terminal user, for example, telephone numbers, address information, or other identifying information, and other users can use the public identification information to build communication with the LTAF apparatus 100. The LTAF apparatus 100 also owns private identification information for each terminal user and correspondingly, on HSS, there exists the corresponding relations for the private identification information and the public identification information.

In an embodiment when the LTAF apparatus 100 performs registration in place of the legacy terminals, the LTAF apparatus 100 brings the private identity corresponding to the terminal to S-CSCF through registration information. The S-CSCF obtains the public identification information of a terminal user corresponding to the terminal through the interaction with HSS, and finally returns the public identification information in the response information of "registration succeeds" indicating a success flag to LTAF apparatus 100, which saves the corresponding relationship of the private and public identities.

Figure 2:
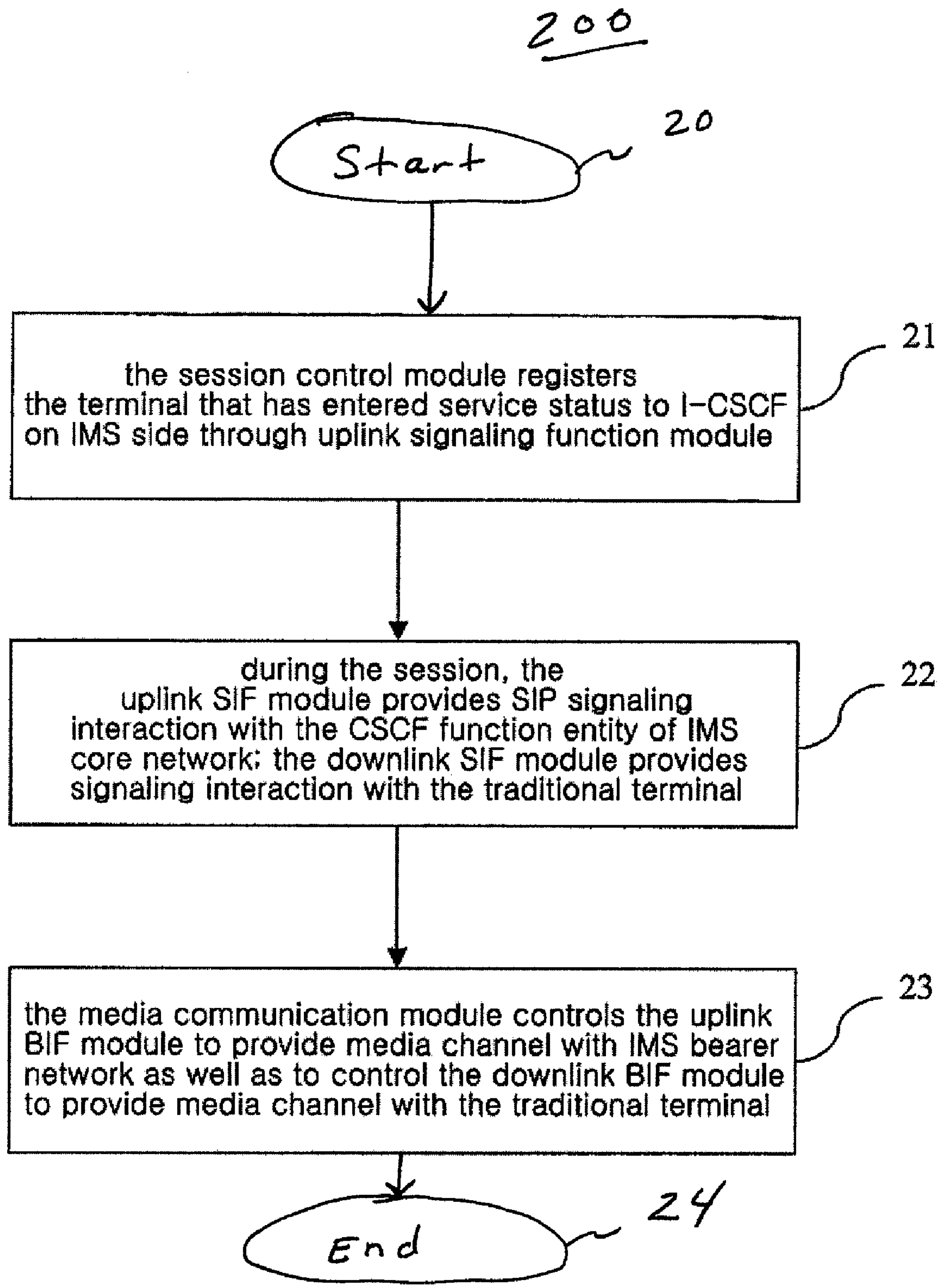
FIG. 2 is a flow chart of a method for realizing the access of the legacy terminal to an IMS system according to an embodiment of the present invention.

FIG. 2, shows a flow chart 200 for realizing the access of the legacy terminal to an IMS system according to an embodiment of the present invention. The method, shown in flowchart 200, may be stored on a computer-readable medium, such as a CD, disk, electronic memory or other suitable medium which can be read by a processor. The electronic storage medium may be, for example a server, or other electronic storage repository that can store data. The memory may include, for example, RAM, ROM, EEPROM or other memory media, such as an optical disk, optical tape, CD, or a floppy disk, a hard disk, or a removable cartridge, on which digital information is stored in the form of bits.

The steps of FIG. 2 may be executed by a processor, or otherwise executed to perform the identified functions and may also be stored in one or more memories. For example, the steps of FIG. 2 may be stored on a computer-readable medium, such as ROM, RAM, EEPROM, CD, DVD, or other non-volatile memory.

As shown in flowchart 200, step 20 is a start step that initiates the algorithm. The session control module detects whether the legacy terminal has entered the service status through said downlink signaling interface function module, and registers the terminal that has entered service status to I-CSCF on IMS side through said uplink signaling interface function module, as shown in step 21.

During the session, the S-CSCF on the IMS side obtains service profile of legacy terminal users based on the interaction with said HSS, under the control of the session control module, the uplink signaling interface function module provides SIP signaling interaction with the CSCF function entity of IMS core network, and the downlink signaling interface function module provides signaling interaction with the legacy terminals, as shown in step 22.

While being controlled by the session control module, the media interworking module provides the connection and media adaptation between uplink bearer interface function module and downlink bearer interface function module and controls the uplink bearer interface function module to provide the media channel with IMS bearer network, and controls the downlink bearer interface function module to provide the media channel with the legacy terminal, as shown in step 23.

The algorithm ends, as shown in step 24.

Figure 3:
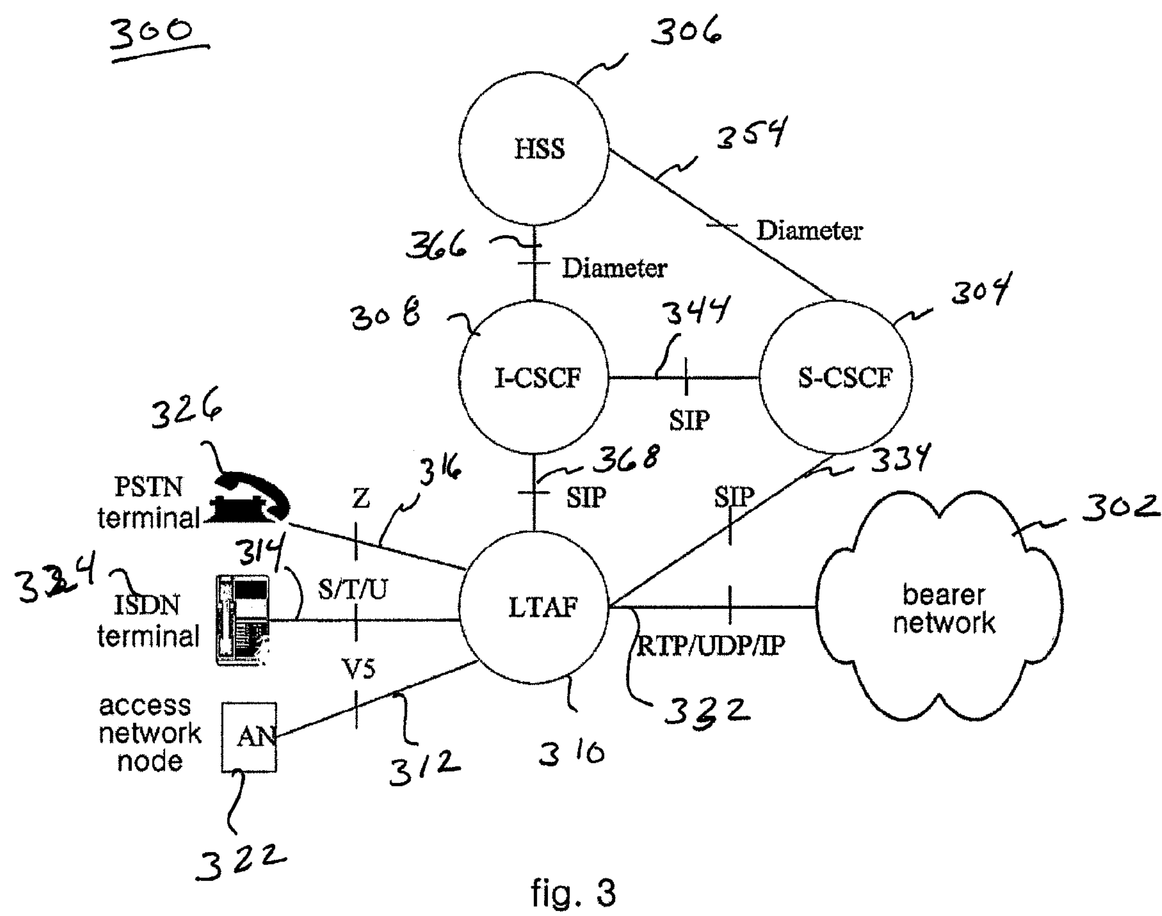
FIG. 3 is a schematic diagram of an example of access of the legacy terminal to an IMS system according to an embodiment of the present invention.

FIG. 3 shows a schematic diagram 300 of an example of the access of the legacy terminal to an IMS system according to an embodiment of the present invention. FIG. 3 shows the various modules, or facilities, or components interfacing with other terminals, modules and/or networks.

The PSTN terminal 326 connects to LTAF apparatus (also referred to as a module, or facility) 310 through Z interface 316, ISDN terminal 324 connects to LTAF module 310 through ISDN BRI S/T interface or U interface 314, and for the terminal that connects to LTAF module 310 through access network 322, it employs V5 interface 312.

The LTAF module 310 interacts with I/S-CSCF module 308 through SIP protocol 368; the related service profile of legacy terminals is stored on HSS module 316, and I/S-CSCF module 304 employs Diameter protocol 354 to interact with HSS module 306. The LTAF module 310 and IMS bearer network 302 employ RTP/UDP/IP interfaces 332. The terminal tag corresponding to the legacy terminal is identified by user number, and meanwhile the user information corresponding to this user number is stored on HSS module 306.

The legacy terminal connects to LTAF module, or facility 310 through communication link, while LTAF facility 310 connects to IMS core network and possesses communication link with IMS function entity such as I/S-CSCF module, or facility etc; each legacy terminal has a private identity and a public identity for each terminal user on LTAF facility 310, as well as the corresponding authentication information; correspondingly, the corresponding relation of terminal user profile (including private identity, public identity, service profiles, authentication information and so on) is stored on the HSS facility, or module 306. The I/S-CSCF module 304 can obtain terminal user profile from HSS module 306.

After LTAF module 310 has entered in working status, it detects whether the legacy terminal has entered in service status and then registers the terminal that has entered in service status to I/S-CSCF module, or facility 304. The I/S-CSCF module 304 takes it as a SIP UA terminal within a common IMS to perform registration flow. If the terminal succeeds in registration, LTAF module 310 sets a tag, or flag, as "terminal registration success", indicating a successful or positive registration and records S-CSCF information of its registration place, otherwise, it sets a tag, or flag as "terminal registration unsuccess" indicating a failure or negative registration.

During the session, S-CSCF module 304 performs the service control flow of SIP session between S-CSCF function entity or module 304 and LTAF module 310 according to the user service profile of legacy terminals obtained from HSS module 306. Meanwhile, LTAF module 310 provides the interworking function between legacy terminal protocol and SIP protocol, and completes the session control flow with legacy terminal on the terminal side.

According to an embodiment of the present invention, the service profile of legacy terminals stored in HSS module 306 is built on the basis of the legacy terminal service capability, i.e., the service profile can not go beyond the service capability scope of legacy terminals.

After LTAF module 310 enters in service status, the session control module performs the terminal registration. Before the registration flow starts, firstly, the session control module finds I-CSCF address through the preconfigured I-CSCF domain name.

Figure 4:
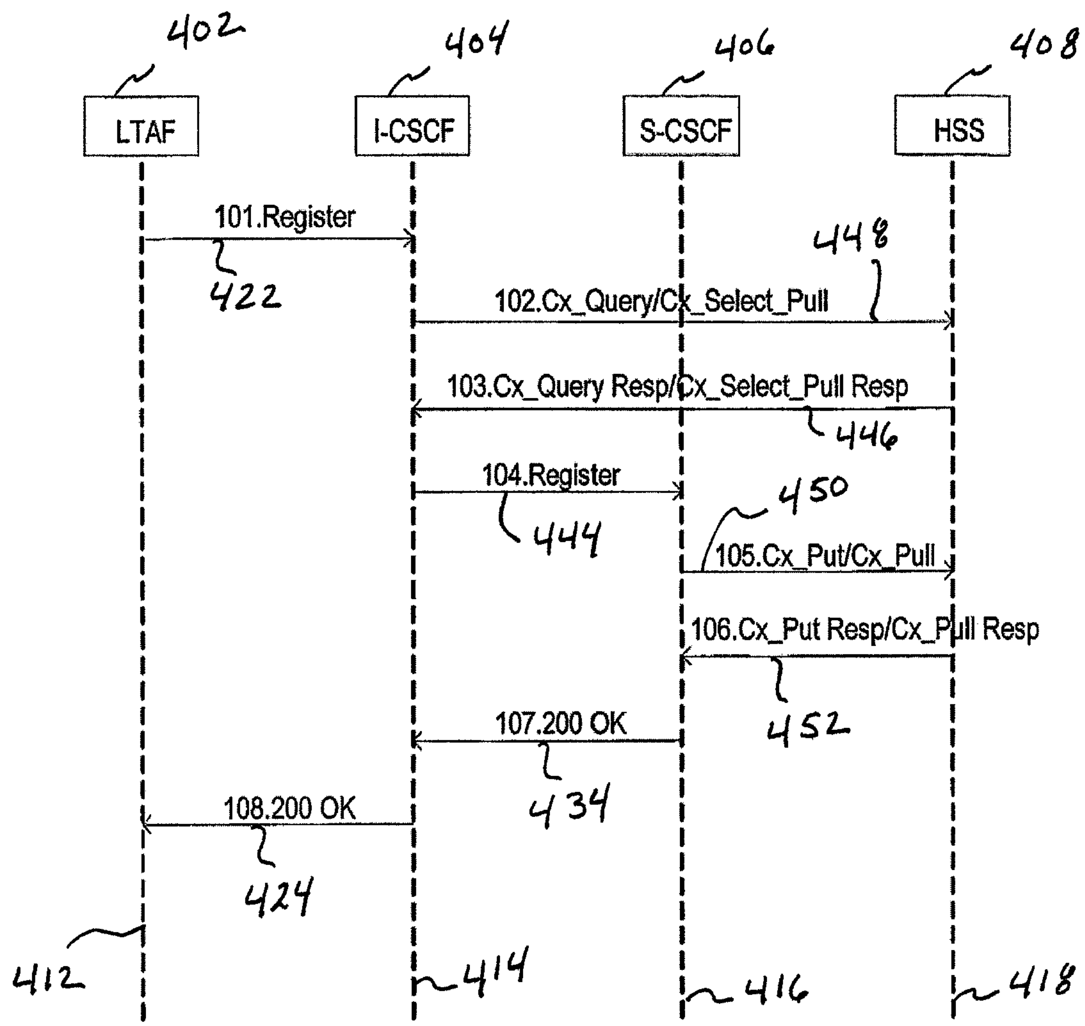
FIG. 4 is a flow chart of the registration of the legacy terminal in an IMS network according to an embodiment of the present invention.

FIG. 4 is a flow chart of the registration of the legacy terminal in an IMS network according to an embodiment of the present invention. As stated in relation to FIG. 2, the steps shown in FIG. 4 may be stored on a computer-readable medium, electronic storage medium or other suitable electronic memory.

FIG. 4 shows representations of LTAF module 402, I-CSCF module 404, S-CSCF module 406 and HSS module 408. Dashed lines 412, 414, 416 and 418 represent an interface to the respective module.

Line 422 shows that step 101. Register indicates that the session control module detects whether the legacy terminal has entered in service status through downlink SIF module and converts the user number of corresponding legacy terminal that has entered service status into SIP-URI format according to RFC2806, it then initiates registration request to I-CSCF module 404 through uplink SIF module.

Line 448 shows that step 102.Cx_Query/Ck_Select_Pull indicates that I-CSCF module 404 initiates legacy terminal user inquiry request to HSS module 408 based on the terminal registration request information.

Line 446 shows that step 103.Cx_QueryResp/Cx_Select_PullResp indicates HSS module 408 returns the domain name of S-CSCF module 406 to I-CSCF module 404.

Line 444 shows that in step 104.Register I-CSCF module 404 obtains the address of S-CSCF module 406 by the domain name of S-CSCF. I-CSCR module 404 sends a terminal registration request to S-CSCF module 406.

Line 450 shows that step 105.Cx_Put/Cx_Pull indicates that S-CSCF module 406 performs terminal registration processing, and initiates an updating request to HSS module 408 with the terminal registration information.

Line 452 shows that step 106.Cx_PutResp/Cx_PullResp indicates that HSS module 408 saves terminal registration information and responds to S-CSCF module 406.

Line 434 shows that step 107.200 OK indicates that S-CSCF module 406 performs the corresponding registration service control and sends SIP 200 OK message to I-CSCF module 404.

Line 424 shows that step 108.200 OK indicates that I-CSCF module 404 sends SIP 200 OK message to LTAF module 402.

Figure 5:
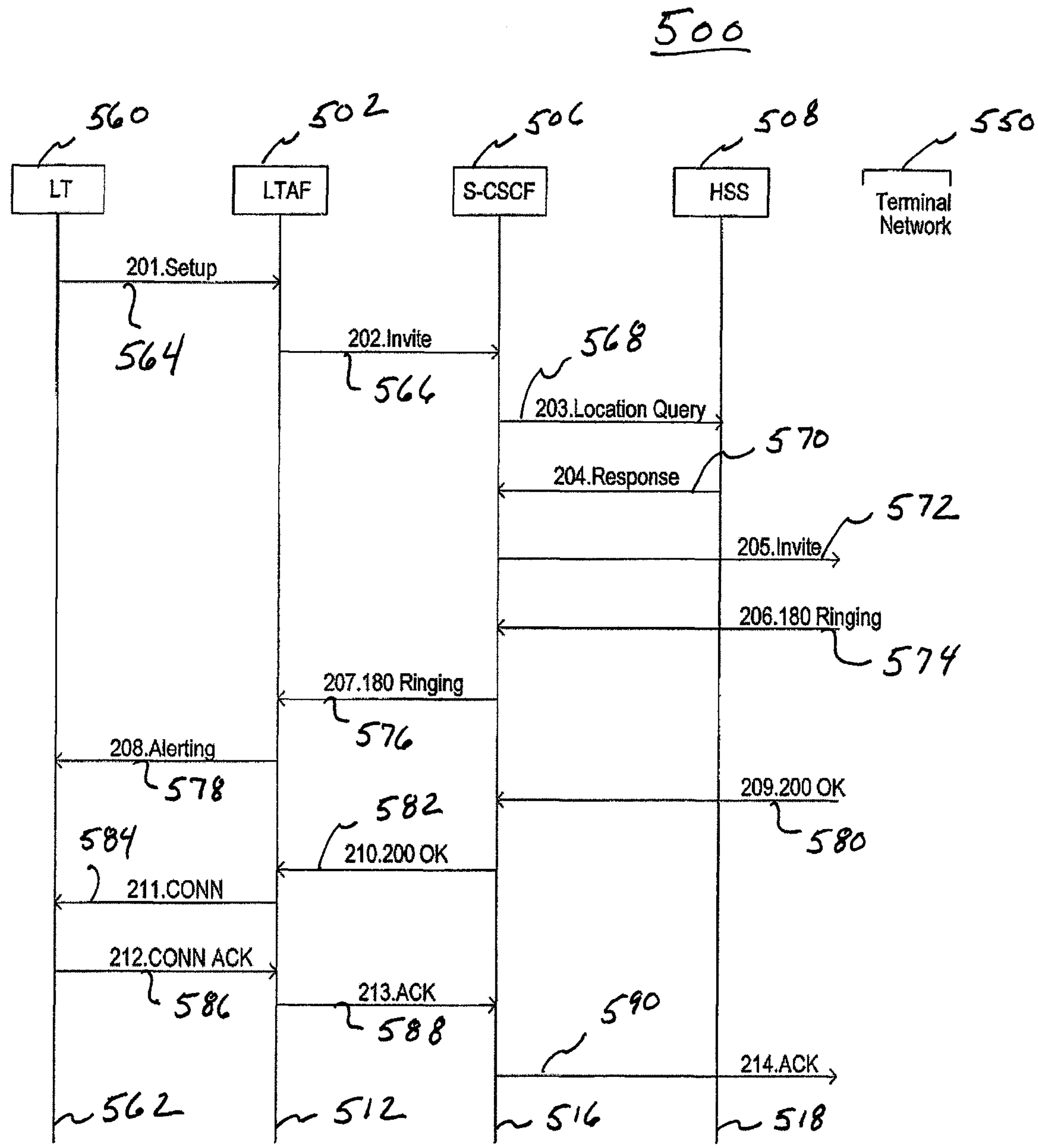
FIG. 5 is a flow chart of calling of the ISDN terminal in an IMS network according to an embodiment of the present invention.

Once the legacy terminal succeeds in registration, LTAF module 402 can provide service function such as calling/ called under the control of S-CSCF module 406. The following embodiments respectively use PSTN terminal and ISDN terminal as the calling party to describe the calling flow. FIG. 5 describes the flow chart of ISDN terminal call and FIG. 6 describes the flow chart of PSTN terminal call.

FIG. 5 is a flow chart of calling of the ISDN terminal in an IMS network according to an embodiment of the present invention. The steps shown in FIG. 5 may be stored on a computer-readable medium, electronic storage medium or other suitable electronic memory. FIG. 5 shows representations of LTAF module 502, S-CSCF module 506, HSS module 508, LT module 560 and Terminal Network 550. Dashed lines 562, 512, 516 and 518 represent an interface to the associated module (i.e., 560, 502, 506 and 508, respectively).

Line 564 shows that step 201.Setup indicates that ISDN terminal 560 is off-hook and initiates the Setup calling request.

Line 566 shows that step 202.Invite indicates that LTAF downlink SIF module 502 receives Setup request and sends it to LTAF call control module for processing; LTAF call control module converts the request into SIP Invite request information, and the uplink SIF module sends it to S-CSCF module 506.

Line 568 shows that step 203.Location Query indicates that according to the received Invite request, S-CSCF module 506 sends Location Query to HSS module 508, inquiring for the location of the called party.

Line 570 shows that step 204.Response indicates that HSS module 508 returns the location information of the called party to S-CSCF module 506.

Line 572 shows that step 205.Invite indicates that S-CSCF module 506 sends SIP Invite request information to the called party.

Line 574 shows that step 206.180 Ringing indicates that the called party responds to S-CSCF module 506 with SIP 180 Ringing message.

Line 576 shows that step 207.180 Ringing indicates that S-CSCF module 506 sends SIP 180 Ringing message to LTAF;

Line 578 shows that step 208.Alerting indicates that after receiving the information, LTAF uplink SIF module 502 informs LTAF session control module 560. LTAF session control module 560 processes the information correspondingly and initiates QoS request to the bearer network, furthermore, after the QoS request succeeds, the session control module 560 informs LTAF media interworking module to build uplink bearer channel. The LTAF media interworking module controls the uplink BIF module to build uplink bearer channel. The LTAF session control module 560 sends Altering information to the terminals through the downlink SIF module;

Line 580 shows that step 209.200 OK indicates that after the called party is off-hook, the called party sends SIP 200 OK information to S-CSCF module 506.

Line 582 shows that step 210.200 OK indicates that S-CSCF module 506 sends SIP 200 OK information to LTAF module 502.

Line 584 shows that step 211.CONN indicates that after receiving the information, LTAF uplink SIF module 502 informs LTAF session control module 560. The LTAF session control module 560 processes the information correspondingly and informs LTAF media interworking module to build a downlink bearer channel. The LTAF media interworking module controls the downlink BIF module to build the downlink bearer channel. The LTAF session control module 560 sends CONN continuity information to the terminals through the downlink SIF module.

Line 586 shows that step 212.CONN ACK indicates that the terminal checks downlink bearer channel and if it is normal, the terminal responds to LTAF with CONN ACK.

Line 588 shows that step 213.ACK indicates that after receiving the information, LTAF downlink SIF module 502 informs LTAF session control module; LTAF session control module processes the information correspondingly and informs LTAF media interworking module to connect the uplink bearer channel and downlink bearer channel, furthermore, through uplink SIF module, it sends SIP ACK to S-CSCF module 506 to confirm the request information.

Line 590 shows that step 214. ACK indicates that S-CSCF module 506 sends SIP ACK information to the called party and the session is established.

Figure 6:
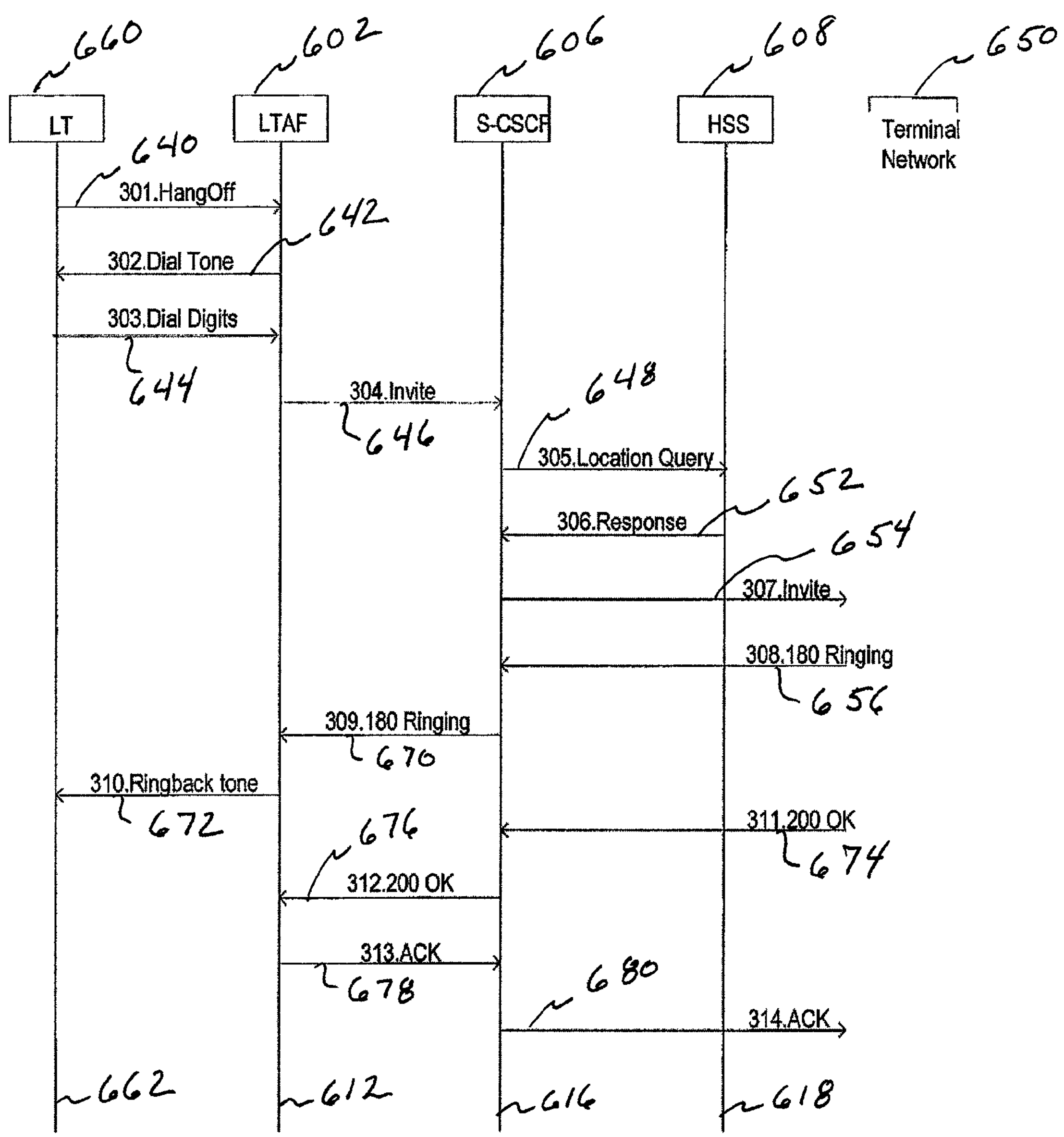
FIG. 6 is a flow chart of calling of the PSTN terminal in an IMS network according to an embodiment of the present invention.

FIG. 6 is a flow chart of calling of the PSTN terminal in an IMS network according to an embodiment of the present invention. The steps shown in FIG. 6 may be stored on a computer-readable medium, electronic storage medium or other suitable electronic memory. FIG. 6 shows representations of LTAF module 602, S-CSCF module 606, HSS module 608, LT module 660 and Terminal Network 650. Dashed lines 662, 612, 616 and 618 represent an interface to the associated module (i.e., 660, 602, 606 and 608, respectively).

Line 640 shows that step 301. Hang Off indicates that PSTN terminal is off-hook and the downlink bearer channel between LTAF module 602 and PSTN is set up.

Line 642 shows that step 302.Dial Tone indicates that LTAF downlink SIF module 602 detects this action and sends Dial tone to the terminal.

Line 644 shows that step 303.Dial Digits indicates that PSTN terminal dials 660 a called number.

Line 646 shows that step 304.Invite indicates that LTAF downlink SIF module 602 detects the dialed number and informs LTAF call control module. The LTAF call control module converts the terminal dialing action into SIP Invite request information, which is sent to S-CSCF module 606 by the uplink SIF module.

Line 648 shows that step 305. Location Query indicates that based on the received Invite request, S-CSCF module 606 sends Location Query request to HSS module 608, inquiring for the location of the called party.

Line 652 shows that step 306.Response indicates that HSS module 608 returns the location information of the called party to S-CSCF module 606.

Line 654 shows that step 307.Invite indicates that S-CSCF module 606 sends SIP Invite request information to the called party, via Terminal Network 650.

Line 656 shows that step 308.180 Ringing indicates that the called party responds to S-CSCF module 606 with SIP 180 Ringing information.

Line 670 shows that step 309.180 Ringing indicates that S-CSCF module 606 sends SIP 180 Ringing information to LTAF module 602.

Line 672 shows that step 310.Ringback tone indicates that after receiving the information, LTAF uplink SIF module 602 informs LTAF session control module 660. The LTAF session control module 660 processes the information correspondingly and initiates QoS request to the bearer network, and after the QoS request succeeds, the session control module informs LTAF media interworking module to build an uplink bearer channel. The LTAF media interworking module controls the uplink BIF module to build the uplink bearer channel. The LTAF session control module 660 sends Ringback tone to the terminals through the downlink SIF module;

Line 674 shows that step 311.200 OK indicates that after the called party is off-hook, the called party sends, via Terminal network 650, SIP 200 OK information to S-CSCF module 606;

Line 676 shows that step 312.200 OK indicates that S-CSCF module 606 sends SIP 200 OK information to LTAF module 602.

Line 678 shows that step 313.ACK indicates that after receiving the information, LTAF uplink SIF module 602 informs LTAF session control module; LTAF session control module processes the information correspondingly and informs LTAF media interworking module to connect the uplink bearer channel and the downlink bearer channel; through the uplink SIF module, it sends SIP ACK to S-CSCF module 606 for confirming the request information.

Line 680 shows that step 314.ACK indicates that S-CSCF module 606 sends SIP ACK information to the called party and the session is established.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What we claim is:

1. An apparatus for realizing an access of a legacy terminal to an Internet Protocol Multimedia Subsystem (IMS) system, wherein said IMS system has a Call Session Control Function (CSCF) entity comprising:

a session control module that provides signaling interworking between terminal signaling and Session Initiation Protocol (SIP) signaling and controls terminal registration and session;

a downlink signaling interface function module that provides signaling interaction with one or more legacy terminals, and provides legacy switch function for one or more legacy terminals operating under the control of said session control module;

a downlink bearer interface function module that provides a media channel with the one or more legacy terminals;

an uplink signaling interface function module that provides SIP signaling interaction with CSCF entity of an IMS core network, and provides SIP User Agent (UA) function for one or more legacy terminals operating under the control of said session control module;

an uplink bearer interface function module that provides a media channel with an IMS carrier network; and a media interworking module that provides connection and media adaptation between the uplink bearer interface function module and the downlink bearer interface function module operating under the control of said session control module.

2. The apparatus as claimed in claim 1, further comprising:

a signaling communication interface configured to interface with said terminal;

a media interface configured to interface with the terminal;

a SIP signaling interface configured to interface with Interrogating/Servicing-CSCF (I/S-CSCF) entity of the IMS core network; and a media interface configured to interface with a bearer network of the IMS core network.

3. The apparatus as claimed in claim 1, further comprising:

a storage module adapted to store a private identity, a public identity and corresponding authentication information of said terminal, and terminal user information.

4. The apparatus as claimed in claim 2, wherein said terminal comprises a Public Switched Telephone Network (PSTN) terminal; and wherein the signaling communication interface with said terminal is Z interface.

5. The apparatus as claimed in claim 2, wherein said terminal comprises an integrated Services Digital Network (ISDN) terminal; and wherein the signaling communication interface with said terminal is ISDN user interface.

6. The apparatus as claimed in claim 2, wherein said terminal comprises a terminal accessing through an accessing network; and wherein the signaling communication interface with said terminal is V5 interface.

7. The apparatus as claimed in claim 2, wherein a Time-Division Multiplexing (TDM) interface is the media interface with the bearer network of the IMS core network.

8. The apparatus as claimed in claim 2, wherein an Internet Protocol (IP) interface is the media interface with the bearer network of the IMS core network.

9. A method for realizing an access of a legacy terminal to an Internet Protocol Multimedia Subsystem (IMS) system comprising performing the following steps with a legacy terminal agent function apparatus:

detecting whether a legacy terminal has entered service status through a downlink signaling interface function module;

performing registration in place of a terminal that has entered service status to an Interrogating-Call Session Control Function (I-CSCF) on an IMS side through said uplink signaling interface function module;

providing Session Initiation Protocol (SIP) signaling interaction with a Serving-Call Session Control Function (S-CSCF) of the IMS core network which has obtained a service profile of legacy terminal users based on the interaction with a Home Subscriber Server (HSS) module;

providing signaling interaction with the legacy terminal;

providing connection and media adaptation between an uplink bearer interface module and a downlink bearer interface module;

controlling the uplink bearer interface module to provide the media channel with the IMS network; and controlling downlink bearer interface function module to provide the media channel with the legacy terminal.

10. The method as claimed in claim 9, wherein said registration process comprises following steps:

converting a user number corresponding to the legacy terminal that has entered service status into SIP-Universal Resource Identifier (URI) format according to Request For Comments (RFC) 2806;

initiating a registration request to I-CSCF through the uplink signaling interface function module;

initiating a legacy terminal user inquiry request to HSS based on terminal registration request information;

returning S-CSCF domain name to the I-CSCF;

obtaining the address of S-CSCF by the domain name analysis of S-CSCF;

sending terminal registration request to S-CSCF;

performing terminal registration processing;

initiating an updating request to HSS with the terminal registration information;

saving terminal registration information and responds to S-CSCF;

performing corresponding registration service control;

sending a positive message to I-CSCF; and sending the positive message to the uplink signaling interface function module.

11. The method as claimed in claim 9, wherein during the registration process of said terminal, if the terminal succeeds in registration, the tag is set to positive; and recording S-CSCF information if the terminal does not succeed in registration setting the tag to negative.

* * * * *